United States Patent Office

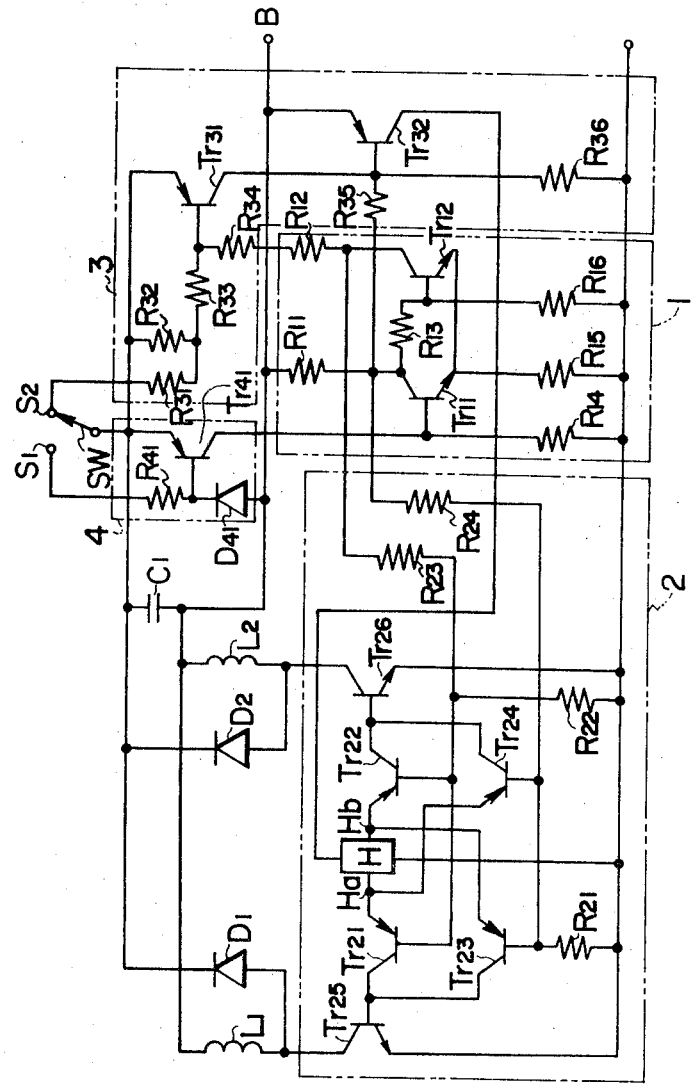

3,706,021
Patented Dec. 12, 1972

3,706,021
DIRECT CURRENT MOTOR WITH ELECTRICAL BRAKING DEVICE
Kiyoshi Yanagida, Tokyo, Japan, assignor to Pioneer Electronic Corporation, Tokyo, Japan
Filed Sept. 17, 1970, Ser. No. 73,168
Claims priority, application Japan, Sept. 17, 1969, 44/73,755
Int. Cl. H02p 5/16
U.S. Cl. 318—302    2 Claims

ABSTRACT OF THE DISCLOSURE

A direct current motor having a rotor with a pair of magnetic poles, a pair of driving coils and a power source and power switching means for supplying current alternatively to the driving coils, is provided with an electrical braking device. This braking device detects an induced voltage generated in the driving coils due to the magnetic poles. When speed change-over means are switched from a fast speed mode to a slow speed mode, that is, if the detected voltage is larger than the predetermined value, the revolution rate of the rotor is higher than a predetermined slow speed rate, the direction of the output current of the power switching means changes, subjecting the rotor to a braking force. The motor is thereby rapidly switched to a slow speed through a purely electrical braking force generated by the driving coils.

BACKGROUND OF THE INVENTION

This invention relates to a direct current motor having an electrical braking device.

In prior art direct current motors having a speed change-over mechanism, the rotor is subjected to braking forces owing only to a load and mechanical loss of the motor itself, thereby slowing down gradually during a speed change-over.

The prior art speed change-over system, as described above, requires considerable time for the rotor to slow down from fast speed rotation to slow speed rotation when there is substantially no load, or when there is a considerable difference between a high revolution rate and a low revolution rate. Thus, these systems are unsatisfactory for machines which require rapid speed change-over.

It is an object of the present invention to provide a direct current motor with an electrical braking device.

It is a more particular object of the present invention to provide a direct current motor having an electrical braking device which causes a rotor to be subjected to an electrical braking force to slow it down rapidly when changing speeds, particularly, when the speed is to be changed from fast to slow, thereby permitting a precise speed change-over in a very short time.

SUMMARY OF THE INVENTION

A direct current motor with an electrical braking device according to the present invention applies an electrical braking force to the rotor through driving coils when the motor is switched to a slow speed rotation.

The electrical braking device according to the present invention comprises a direct current motor having a rotor with magnetic poles and driving coils. A power switching means supplies current alternatively to the driving coils. The device further comprises means for detecting voltages induced in the driving coils, and means for changing the direction of the output current of the power switching means. A change in current direction causes the rotor to be subjected to a braking force only when the revolution rate is faster than a predetermined slow rate after the motor is switched to a slow speed mode.

BRIEF DESCRIPTION OF THE DRAWING

The figure is a circuit diagram showing the preferred embodiment of a direct current motor having an electrical braking device according to the present invention.

DESCRIPTION OF THE PREFERRED EMBODIMENT

Referring to the figure, block 1, shown in dotted lines, is a Schmitt circuit consisting of resistors $R_{11}$, $R_{12}$, ..., $R_{16}$ and transistor $T_{r11}$, $T_{r12}$ where transistor $T_{r11}$ is normally in a nonconducting state (denoted hereinafter "OFF") and transistor $T_{r12}$ is normally in a conducting state (denoted hereinafter "ON"). Block 2 is a power switching circuit consisting of resistors $R_{21}$, $R_{22}$, ..., $R_{24}$, transistors $T_{r21}$, $T_{r22}$, ..., $T_{r26}$, and a Hall element H. Block 3 is a constant speed circuit consisting of resistors $R_{31}$, $R_{32}$, ..., $R_{36}$ and transistors $T_{r31}$, $T_{r32}$. Block 4 is an induced voltage detecting circuit consisting of a resistor $R_{41}$, a Zener diode $D_{41}$ and a transistor $T_{r41}$. In the drawing are shown further a resistor $R_1$, driving coils $L_1$ and $L_2$ of a motor, diodes $D_1$ and $D_2$ and a smoothing capacitor $C_1$.

Reference character B represents a power line connection terminal, Ha and Hb are output terminals of the Hall element, and SW is a speed change-over switch where $S_1$ is a slow speed side terminal and $S_2$ is a fast speed side terminal.

In operation, when a D.C. voltage is supplied to power line connection terminal B, transistor $T_{r11}$ of the Schmitt circuit 1 turns OFF and transistor $T_{r12}$ turns ON, therefore the collector voltage of transistor $T_{r11}$ is high and that of transistor $T_{r12}$ is low. Also, in the power switching circuit 2, the output of transistor $T_{r11}$ of the Schmitt circuit is applied through resistor $R_{24}$ to the bases of transistors $T_{r23}$ and $T_{r24}$ to raise their base potentials, so that transistors $T_{r23}$ and $T_{r24}$ turn OFF. The output voltage of transistor $T_{r12}$ is applied through resistor $R_{23}$ to the bases of transistors $T_{r21}$ and $T_{r22}$ to lower their base potentials, so that transistors $T_{r21}$ and $T_{r22}$ turn ON. The collector current of transistors $T_{r32}$ of the constant speed circuit 3 is a control current for Hall element H of the power switching circuit 2. The Hall element H, located in a magnetic field, generates between voltage terminals Ha and Hb, in response to inflow of the control current, an electromotive force which is proportional to the product of the magnetic flux density and the control current. Also, the direction of the vector of the electromotive force is determined by the direction in which the magnetic field traverses the Hall element. Therefore, if output terminal Ha of the Hall element is at a higher potential than is terminal Hb, the output voltage at terminal Ha is applied to the base of transistor $T_{r25}$ because the base potentials of transistors $T_{r21}$ and $T_{r22}$ are within their operable range, therefore transistor $T_{r25}$ turns ON. On the other hand, if output terminal Hb is at a higher potential than is terminal Ha, transistor $T_{r26}$ turns ON. That is, when terminal Ha is at a higher potential than Hb, current flows in driving coil $L_1$, whereas, when terminal Hb is at a higher potential than Ha, current flows in driving coil $L_2$. In both cases current is supplied in the direction in which a starting torque is generated.

The operation in the regular revolution state is as follows. Induced voltages generated in driving coils $L_1$ and $L_2$ are applied to diodes $D_1$, $D_2$, respectively, and smoothed by smoothing capacitor $C_1$ to become an input to the constant speed circuit 3. If the revolution rate deviates somewhat from a predetermined revolution rate, the induced voltages generated in driving coils $L_1$ and $L_2$ increase or decrease in proportion to the revolution rate and, thus, the collector current of transistor $T_{r31}$ also increases or decreases. As a result, the base voltage of transistor $T_{r32}$ varies and the collector current of transistor $T_{r32}$. Therefore, the control current for Hall element H, increases or decreases so as to suppress fluctuation in the revolution rate.

Then, if switch SW is switched from the fast speed side terminal $S_2$ to the slow speed side terminal $S_1$, the transistor $T_{r41}$ in the induced voltage detecting circuit 4 turns ON due to the induced voltages in driving coils $L_1$ and $L_2$. At this point the base voltage of transistor $T_{r41}$ is the same as the Zener voltage of Zener diode $D_{41}$. The collector current of the detecting circuit flows in resistor $R_{14}$, so that the base voltage of transistor $T_{r11}$ rises and this transistor turns ON, and transistor $T_{r12}$ turns OFF. Hence, transistors $T_{r21}$ and $T_{r22}$ of the power switching circuit 2 turn OFF and transistors $T_{r23}$ and $T_{r24}$ turn ON. Resistors $R_{23}$ and $R_{24}$ function to transmit the output of the Schmitt circuit to the bases of transistors $T_{r21}$ and $T_{r22}$ and transistors $T_{r23}$ and $T_{r24}$, and determine their base potentials. Thus, if output terminal H$a$ of Hall element H is at a higher potential than terminal H$b$, transistor $T_{r26}$ turns ON, whereas, if terminal H$b$ is higher in potential, transistor $T_{r25}$ turns ON. Therefore, current flows in driving coil $L_1$ or $L_2$ in a direction generating a braking force, thereby rapidly decreasing the revolution rate. If the induced voltage becomes lower than a voltage determined by the Zener diode, that is, if the revolution rate becomes smaller than a predetermined rate, the detecting circuit 4 turns OFF and the Schmitt circuit 1 recovers. Upon termination of the braking action the constant speed circuit again begins to effect speed regulation.

The foregoing explanation has been limited to the case of one pair of driving coils and rotor magnetic poles. It is of course possible to provide more than one pair thereof if desired. Further, although transistors are employed as switching elements in the power switching circuit 2, it is possible to utilize other switching elements such as relays in the power switching circuit. Additionally, a multi-speed change-over system may be embodied.

As was explained hereinabove, the present invention resides in the direct current motor having an electrical braking device which, when the motor is changed from a fast speed state to a slow speed state, generates a reverse revolution torque on the rotor as a braking force. Thereby, the present invention permits rapid speed changeover and has advantages such that it provides precise speed change-over. This is due in part to a Zener diode used in the induced voltage detecting circuit. Further, the present invention has excellent durability and reliability because this system is a purely electrical braking system. Consequently, the present invention is very practical because it not only improves the performance of machines employing the present direct current motors, but also mass-production of high-performance direct current motors can be effected with low cost as the applicable sphere of the direct current motor expands.

While the preferred embodiment of the present invention has been described herein, it is appreciated that variations and modifications may be made without departing from the spirit of the invention.

What is claimed is:

1. A direct current motor having an electrical braking device comprising a rotor having at least one pair of magnetic poles, a pair of driving coils for rotating said rotor, a power source and power switching means for supplying current alternatively to said pair of driving coils, magnetic-electric converting means for controlling said power switching means by means of its output voltage, said output voltage varying in accordance with the variation of the magnetic field generated by said magnetic poles of said rotor, speed switching means for setting the revolution rate of said rotor at one of at least two predetermined revolution rates, induced voltage detecting means for detecting voltages which are induced in said driving coils when said speed switching means is switched from a fast speed mode to a slow speed mode, and current direction changing means responsive to said induced voltage detecting means for changing said power switching means such that the direction of the current through said coils is reversed and said rotor is thereby subjected to a braking force.

2. A direct current motor having an electrical braking device as set forth in claim 1, wherein said magnetic-electric converting means are Hall elements.

References Cited

UNITED STATES PATENTS

| | | | |
|---|---|---|---|
| 3,521,139 | 7/1970 | Kendall | 318—373 X |
| 3,536,972 | 10/1970 | Lutz et al. | 318—331 |

BERNARD A. GILHEANY, Primary Examiner

W. E. DUNCANSON, JR., Assistant Examiner

U.S. Cl. X.R.

318—331, 373